2,995,585
Patented Aug. 8, 1961

2,995,585
M-SULFO BENZOATES OF STEROID HORMONES
André Allais and Pierre Girault, Paris, France, assignors to Les Laboratoires Français de Chimiotherapie, Paris, France, a corporation of France
No Drawing. Filed Apr. 13, 1959, Ser. No. 805,674
Claims priority, application France Apr. 21, 1958
4 Claims. (Cl. 260—397.4)

The present invention relates to new and valuable esters of steroid hormones and more particularly to m-sulfo benzoates of steroid hormones and to a process of making same.

In copending patent application Serial No. 760,575, filed September 12, 1958, there is described a process of preparing water soluble 21-o-sulfo benzoates of $\Delta^{1,4}$-dehydro-corticosteroids and alkaline metals corresponding to Formula I.

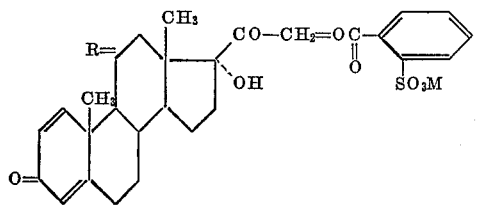

In said formula:
R indicates the secondary hydroxyl group

or the keto group =O and
M indicates an alkali metal.

Said water soluble alkali metal 21-o-sulfo benzoates of $\Delta^{1,4}$-dehydrocorticosteroids are prepared by reacting, in a neutral solvent, a functional derivative of o-sulfo benzoic acid, such as its dichloride or its anhydride, in the presence of a tertiary base, with the $\Delta^{1,4}$-corticosteroid compound. Thereby, the primary alcohol group in 21-position of the $\Delta^{1,4}$-dehydrocorticosteroid compound is esterified by the carboxyl group of o-sulfo benzoic acid while, at the same time, the sulfonic acid group is converted into the sulfonate group. However, when attempting a similar reaction with a functional derivative of m-sulfo benzoic acid, it is not possible to arrive at the desired m-sulfo benzoate of $\Delta^{1,4}$-dehydrocorticosteroids.

It is one object of the present invention to provide a simple and effective process of preparing alkali metal salts of 21-m-sulfo benzoates of $\Delta^{1,4}$-dehydrocorticosteroid compounds.

Another object of the present invention is to provide the sodium salt of m-sulfo benzoate of $\Delta^{1,4}$-pregnadiene-11$\beta$,17$\alpha$,21-triol-3,20-dione of Formula II wherein M indicates sodium.

A further object of the present invention is to provide a simple and effective process of preparing alkali metal salts of 17-m-sulfo benzoates of steroid compounds of the androstane series.

Still another object of the present invention is to provide alkali metal salts of 17-m-sulfo benzoates of steroid compounds of the androstane series.

A further object of the present invention is to provide the sodium salt of the m-sulfo benzoate testosterone and the sodium salt of the m-sulfo benzoate of 17$\beta$-hydroxy androstane-3-one.

Other objects of the present invention and advantageous features thereof will become apparent as the description proceeds.

In principle the present invention consists in first preparing m-carboxy benzene sulfonyl chloride of the formula

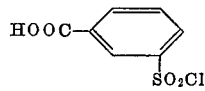

preferably by the action of chloro sulfonic acid on benzoic acid. Said m-carboxy benzene sulfonyl chloride acid is converted into its crystalline pyridine complex compound the exact structure of which is not known. Said complex compound is then reacted in an inert solvent with the $\Delta^{1,4}$-corticosteroid compound in the presence of a strong tertiary aliphatic amine such as triethylamine. As a result thereof the desired 21-m-sulfo benzoate is formed. It is quite surprising that this reaction takes place as the same pyridine complex compound when reacted in the presence of pyridine, does not yield the desired object. After esterification is completed, the solvent and the bases are driven off by distillation. The reaction mixture is treated with an aqueous sodium, potassium, or lithium hydroxide solution, thereby producing a solution of the desired sodium, potassium, or lithium salt of the m-sulfo benzoate of Formula II.

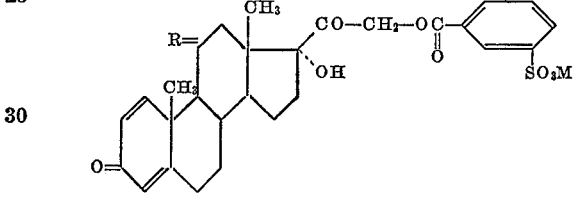

In said Formula II
R indicates the secondary alcohol group

on the keto group=O, while
M indicates an alkali metal.

The resulting salt is readily salted out by the addition of an alkali metal salt, the alkali metal component of which corresponds to that previously used, for instance by the addition of the acetates of sodium, potassium, or lithium. Thereafter the m-sulfo benzoate, of Formula II is purified by recrystallization. It is, of course, also possible, without deviating from the scope of the present invention, to dilute the reaction mixture with an inert water insoluble solvent, which either corresponds or does not correspond to that in which esterification was effected, and to transfer the desired salt into the aqeous phase by washing with an aqueous solution of the hydroxides of sodium, potassium, or lithium. After separation of the two phases, the aqueous phase is salted out and the resulting salt is purified by crystallization.

The resulting alkali metal salts of the m-sulfo benzoates of $\Delta^{1,4}$-corticosteroid compounds are readily soluble in water and, thus, permit to use these hormones in the form of their aqueous solutions. The sulfo benzoil radical renders the compounds sufficiently water soluble and also imparts to them highly advantageous antiseptic properties in pharmaceutical compositions, such as, for example, in collyria. In contrast to the o-sulfo benzoates described in the above-mentioned copending patent application Serial No. 760,575 the new m-sulfo benzoates according to the present invention are more readily saponifiable in the organism as hydrolysis in an aqeous medium proceeds more rapidly.

According to another embodiment of the present invention steroids of the 17-hydroxy androstane series can also be converted into the corresponding alkali metal salts of their 17-m-sulfo benzoates by heating the complex formed between pyridine and m-carboxy benzene sulfonyl chloride, in the presence of pyridine, in the very medium in which the pyridine complex is prepared. It has been well established in the art that steroids of the 17-hydroxy androstane series yield 17-esters only with difficulty and in an incomplete manner under conditions under which the 21-m-sulfo benzoates of $\Delta^{1,4}$-corticosteroid compounds are readily esterified. For instance, after 16 hours of heating testosterone with the pyridine complex compound of m-carboxy benzene sulfonyl chloride in the presence of triethylamine, at least 30% of the hormone are found to be unchanged and with 17β-hydroxy androstone-3-one, the proportion of unesterified starting hormone reaches 40%.

The possibility of carrying out esterification in the same medium in which the pyridine complex is prepared is of considerable advantage in the esterification of steroid compounds of the 17-hydroxy androstane series. This new process, therefore, has the double advantage that preparation of such esters is greatly simplified and that their preparation is rendered more economical due to the considerably improved yields achieved thereby.

In principle this specific embodiment of the present invention consists in reacting a steroid of the 17-hydroxy androstane series with the pyridine complex compound of m-carboxy benzene sulfonyl chloride, in the presence of pyridine and preferably directly in the medium in which the pyridine complex has been prepared. The pyridine salt of the resulting acid ester is freed by distillation of free pyridine and is then converted into the desired alkali metal salt by the addition of the corresponding alkali metal hydroxide. The resulting alkali metal salt is precipitated by salting it out with the corresponding alkali metal acetate and is finally purified.

The following examples serve to illustrate the present invention, without, however, limiting the same thereto. More particularly, other strong aliphatic tertiary bases, such as tributylamine, may be used instead of triethylamine and other solvents than those employed in the examples may be used. The reaction temperature and duration may be varied without departing from the scope of the present invention. The melting points given in the examples are points of instantaneous melting, determined on the Maquenne block.

EXAMPLE 1

*Preparation of the sodium salt of the 21-m-sulfo benzoate of $\Delta^{1,4}$-pregnadiene-11β,17α,21-triol-3,20-dione of Formulate II*

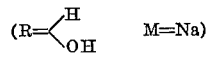

(a) *Preparation of m-carboxy benzene sulfonyl chloride.*—225 g. of pure benzoic acid are introduced with stirring into 600 g. of chloro sulfonic acid. The temperature rises spontaneously to 40° C. The reaction mixture is heated for one hour at 130–140° C., then cooled to room temperature, and poured on ice. m-Carboxy benzene sulfonyl chloride precipitates. It is filtered off, washed by forming a paste with water, dried in a vacuum, and recrystallized from benzene. After drying, 250 g. of m-carboxy benzene sulfonyl chloride are obtained; melting point: 136–137° C. The acid chloride contains 16.0% of chlorine (the theoretical chlorine content is 16.1%). The compound is identical to the compound described by Delaby, "Bull. Soc. Chim. France," 1945, vol. 12, page 954.

(b) *Preparation of the pyridine complex compound of m-carboxy benzene sulfonyl chloride.*—12 g. of the sulfonyl chloride prepared as described above under (a) are introduced into 80 cc. of pyridine while stirring and operating in a nitrogen atmosphere. Dissolution takes place while the temperature rises to 35° C. The solution is then heated at 70° C. for 15 minutes while continuing stirring. The complex compound starts to crystallize after heating for 10 minutes. The mixture is then cooled to room temperature and stirring is continued for one hour. The resulting crystalline complex compound is filtered and washed by forming a paste with anhydrous chloroform. After drying, 12 g. of the complex compound which melts at 125° C. are obtained. Analysis shows a content of 1.0% of chlorine and 5% of nitrogen.

(c) *Condensation of the pyridine complex compound with $\Delta^{1,4}$-pregnadiene-11β,17α,21-triol-3,20-dione, of Formula II*

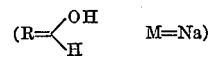

6 g. of the pyridine complex compound of m-carboxy benzene sulfonyl chloride prepared according to (b) and 40 cc. of anhydrous chloroform are added to 4 g. of $\Delta^{1,4}$-pregnadiene-11β,17α,21-triol-3,20-dione. 5 cc. of anhydrous triethylamine are then introduced while passing nitrogen through the mixture and mechanically stirring the same. The temperature rises to 30° C. and the mixture is refluxed for one hour. The resulting orange colored solution is cooled to room temperature, evaporated to dryness in a vacuum, and the residue is taken up with 100 cc. of water. 34 cc. of N sodium hydroxide solution are added to the aqueous solution and then 2 cc. of acetic acid and 100 cc. of a saturated aqueous solution of sodium acetate are admixed thereto. The desired sodium m-sulfo benzoate of Formula II is precipitated in a gummy state. It is separated by decanting, redissolved in 50 cc. of water, and again precipitated by pouring the aqueous solution into 100 cc. of a saturated aqueous solution of sodium acetate. The precipitate is triturated, filtered, washed by forming a paste with a saturated solution of sodium acetate, and then dried. Thus 6 g. of the crude sodium salt of the m-sulfo benzoate of $\Delta^{1,4}$-pregnadiene-11β,17α,21-triol-3,20-dione of Formula II

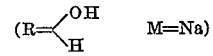

are obtained which is purified by recrystallization from 3 volumes of water. After standing overnight in a refrigerator, the precipitated crystals are filtered and washed with a minimum of ice water and then by forming a paste with a little acetone. After drying, 3.35 g. of the pure salt are obtained in the form of crystalline needles. The yield is 53.4% calculated for the starting hormone. This compound melts at 293–295° C. (with decomposition); optical rotation $[\alpha]_D^{20} = +170° \pm 1.5°$ (concentration: 1% in water). It is slightly hygroscopic, insoluble in acetone, benzene, chloroform, and ether, slightly soluble in alcohol, readily soluble in warm water, and to about 2% soluble in cold water. A 1% aqueous solution shows a pH of 6.26 and is completely hydrolyzed within 4 hours.

*Analysis.*—$C_{28}H_{31}O_9SNa$; molecular weight: 566.6.—Calculated: C=59.35%; H=5.51%; S=5.66%; Na=4.06%. Found: C=59.5%; H=5.5%; S=5.7%; Na=3.8%.

This product has not been previously described in the literature.

On proceeding as described in this example and using $\Delta^1$-dehydrocortisone as corticosteroid compound, the sodium salt of the 21-m-sulfo benzoate of $\Delta^1$-dehydrocortisone is prepared.

EXAMPLE 2

*Preparation of the sodium salt of the m-sulfo benzoate of testosterone*

5 g. of testosterone are added to the pyridine complex compound prepared from 7.5 g. of m-carboxy benzene sulfonyl chloride as described hereinabove in Examples 1(a) and 1(b) in 60 cc. of pyridine. After heating for 4 hours at 70° C. in a nitrogen atmosphere, the mixture is cooled and distilled to dryness in a vacuum. The residue is dissolved in 30 cc. of water and 2 cc. of acetic acid and 42.5 cc. of N sodium hydroxide solution are added thereto in an evacuated vessel. The pyridine set free thereby is distilled off and 2 cc. of acetone and 10 cc. of a 50% sodium acetate solution are added. The sodium salt of the m-sulfo benzoate of testosterone begins to precipitate and is allowed to stand overnight. It is then filtered and washed with a 10% aqueous solution of sodium acetate. After drying, 7 g. of the crude salt are collected and recrystallized by dissolving in 8 volumes of hot water, adding animal charcoal thereto, filtering, and allowing the solution to stand overnight at room temperature. The recrystallized product is filtered and a paste is formed by mixing the crystals wih 10 cc. of ice water. After drying in a vacuum, 5.7 g. of the sodium salt of the m-sulfo benzoate of testosterone (corresponding to a yield of 67% with respect to the testosterone used) are collected in the form of fine white needles, which are soluble in water and aqueous chloroform, and insoluble in anhydrous chloroform, acetone, benzene, alcohol, or ether. The compound is slightly hygroscopic (moisture content: 4.4%); optical rotation $$[\alpha]_D^{20} = +116° \pm 1.5°$$

(concentration: 1% in water).

*Analysis.*—$C_{26}H_{31}O_6NaS$; molecular weight: 494.57. Calculated: 63.15% C; 6.31% H; 6.48% S; 4.65% Na. Found: 63.4% C; 6.2% H; 6.7% S; 4.5% Na.

Ultra violet spectrum:

$$E_{1\,cm.}^{1\%} = 426 \text{ at } 240 \text{ m}\mu$$

This compound has not been described in the literature.

EXAMPLE 3

*Preparation of the sodium salt of the m-sulfo benzoate of 17β-hydroxy androstane-3-one*

Following the procedure described in Example 2 and using, in place of testosterone, 5 g. of 17β-hydroxy androstane-3-one as starting material, 5.1 g. of the sodium salt of the m-sulfo benzoate of 17β-hydroxy androstane-3-one are obtained; optical rotation $[\alpha]_D^{20} = +70.5° \pm 1.5°$ (concentration: 0.5% in 50% aqueous ethanol). This compound is prepared in the form of white prisms which are soluble in water and insoluble in alcohol, ether, acetone, benzene, or chloroform.

*Analysis.*—$C_{26}H_{33}O_6NaS$; molecular weight: 496.6. Calculated: 62.88% C; 6.69% H; 4.63% Na; 6.45% S. Found: 62.9% C; 6.6% H; 4.5% Na; 6.6% S.

Ultra violet spectrum:

$$E_{1\,cm.}^{1\%} = 231 \text{ at } 231 \text{ m}\mu$$

This compound has not been described in the literature.

In place of chloroform used in Example 1 as inert organic solvent, there may be employed other halogenated lower aliphatic hydrocarbons.

In place of triethylamine used as strong tertiary aliphatic amine in Example 1 or of tri-n-butylamine mentioned hereinabove, there may be used other tertiary lower alkylamines.

In place of $\Delta^1$-dehydrocortisol and $\Delta^1$-dehydrocortisone used in Example 1, there may be employed the corresponding 9-fluoro derivatives or, respectively, 6-methyl or 16-methyl substitution products or the like $\Delta^{1,4}$-dehydrocorticosteroid compounds.

We claim:

1. The sodium salt of the 17-m-sulfo benzoate of testosterone.
2. The sodium salt of the 17-m-sulfo benzoate of 17β-hydroxy androstane-3-one.
3. The alkali metal salts of the 17-m-sulfo benzoate of testosterone.
4. The alkali metal salts of the 17-m-sulfobenzoates of a steroid compound of the androstane series of the formula

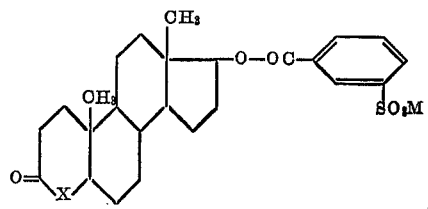

wherein:

X is a member selected from the group consisting of —$CH_2$— and —CH=, while

M is an alkali metal.

References Cited in the file of this patent

UNITED STATES PATENTS

| | | |
|---|---|---|
| 2,225,662 | Schwenk et al. | Dec. 24, 1940 |
| 2,750,377 | Hindermann et al. | June 12, 1956 |
| 2,774,775 | Korman et al. | Dec. 18, 1956 |
| 2,813,108 | Hanze | Nov. 12, 1957 |

OTHER REFERENCES

Gould et al.: J. Am. Chem. Soc., vol. 79, pages 4472–75 (1957).